(12) United States Patent
Chen

(10) Patent No.: US 6,549,305 B1
(45) Date of Patent: Apr. 15, 2003

(54) OPTICAL SCANNER

(75) Inventor: Michael Chen, Hsin-Chu (TW)

(73) Assignee: Avison Inc., Hsinchu (TW)

( * ) Notice: Subject to any disclaimer, the term of this patent is extended or adjusted under 35 U.S.C. 154(b) by 0 days.

(21) Appl. No.: 09/391,325

(22) Filed: Sep. 8, 1999

(30) Foreign Application Priority Data

Apr. 23, 1999 (TW) .................................... 88106477 A

(51) Int. Cl.⁷ ............................................... H04N 1/04
(52) U.S. Cl. ..................................................... 358/475
(58) Field of Search ................................ 358/475, 509; 399/51, 69; 250/234; 355/30; 362/6

(56) References Cited

U.S. PATENT DOCUMENTS 5,336,976 A * 8/1994 Web et al.
5,907,742 A * 5/1999 Johnson et al. ................ 399/51
6,239,884 B1 * 5/2001 Yamamoto ................... 358/475
6,316,767 B1 * 11/2001 Paxton et al. ................ 250/234

* cited by examiner

*Primary Examiner*—Cheukfan Lee
(74) *Attorney, Agent, or Firm*—Winston Hsu

(57) ABSTRACT

The invention relates to an optical scanner for saving power. The optical scanner comprises a scanning module for scanning a document to generate corresponding image signals, a cold cathode ray tube for supplying lights to the document when scanning the document, a power source for supplying electric power to the cold cathode ray tube, and a control circuit for controlling operations of the scanner. When the scanning module is in an idle state, the control circuit controls the active period of each of the power source's duty cycles to reduce the electric power supplied to the cold cathode ray tube so that the cold cathode ray tube can be maintained in a warm state and the startup time for warming the cold cathode ray tube to scan the document is reduced.

7 Claims, 4 Drawing Sheets

| Digital control signals | Warming direct voltage | Warming time |
|---|---|---|
| 111 | 12V | 0 seccond |
| 110 | 10V | 5 secconds |
| 101 | 8V | 10 secconds |
| 100 | 6V | 20 secconds |
| 001 | 5V | 60 secconds |
| 000 | 0V | 180 secconds |

Fig. 2

OPTICAL SCANNER

BACKGROUND OF THE INVENTION

1. Field of the Invention

The invention relates to an optical scanner, and more particularly, to an optical scanner for controlling electric power supplied to a cold cathode ray tube according to its status.

2. Description of the Prior Art

Generally, an optical scanner conserves power by regulating electric power supplied to the light source based on scanner status. The optical scanner power regulation method (Taiwan patent number 283818) relates to a method for controlling the power supplied to the cold cathode ray tube of an optical scanner. During scanning, the power supply of the cold cathode ray tube is maintained at a high voltage. When the scanner is idle, the power supply of the cold cathode ray tube is maintained at a low voltage to save energy.

Please refer to FIG. 1. FIG. 1 is a functional block diagram of a prior art optical scanner 10. The optical scanner 10 comprises a signal control device 12, a warming power generator 14, and a cold cathode ray tube 16. The signal control device 12 is a digital/analog converter. Different digital control signals are inputted into the signal control device 12 through the input ports 11, and different voltage values are outputted from output ports 13 of the signal control device 12 to the warming power generator 14. The warming power generator 14 comprises an operation magnifier 18, a darlington transistor 19, and an alternate/direct ascending voltage circuit 20. The voltage is processed by the operation magnifier 18 and darlington transistor 19 to produce a warming direct voltage 15. The value of the voltage 15 represents the warming time of the cold cathode ray tube 16. During warming up of the cold cathode ray tube 16, the electric power is supplied at a low voltage. This saves energy.

Please refer to FIG. 2. FIG. 2 is a diagram showing the relationship between the digital control signals of the optical scanner 10 and the warming time of the cold cathode ray tube 16. A warming time is selected after use of the optical scanner 10 is completed. As shown in FIG. 2, when the digital control signals inputted into the input ports 11 of the signal control device 12 are 110, the warming time of the cold cathode ray tube 16 is five seconds. When the digital control signals are 000, the warming time of the cold cathode ray tube 16 is 180 seconds.

The prior art optical scanner 10 is complex and expensive. Accurate selection of a warming time is subject to human error. If an excessively long warming time is selected, the wait time is also excessive. On the other hand, electric power is wasted if the warming time selected is too short.

SUMMARY OF THE INVENTION

It is therefore a primary objective of the present invention to provide an optical scanner for controlling electric power supplied to a cold cathode ray tube according to its status.

Briefly, in a preferred embodiment, the present invention provides an optical scanner comprising:

a scanning module for scanning a document to generate corresponding image signals;

a cold cathode ray tube for supplying lights to the document when scanning the document;

a power source for supplying electric power to the cold cathode ray tube; and a control circuit for controlling operations of the scanner; wherein when the scanning module is in an idle state, the control circuit controls the active period of each of the power source's duty cycles to reduce the electric power supplied to the cold cathode ray tube so that the cold cathode ray tube can be maintained in a warm state and the startup time for warming the cold cathode ray tube to scan the document is reduced.

It is an advantage of the present invention that the scanner provides an effective method for saving power by controlling the length of time power is supplied. The warming time is shorter if the scanner starts scanning after being idle. The optical scanner is simple to produce inexpensively.

These and other objects and the advantages of the present invention will no doubt become obvious to those of ordinary skill in the art after having read the following detailed description of the preferred embodiment that is illustrated in the various figures and drawings.

BRIEF DESCRIPTION OF THE DRAWINGS

FIG. 2 is a diagram showing the relationship between the digital control signals of the optical scanner and the warming time of the cold cathode ray tube.

DETAILED DESCRIPTION OF THE PREFERRED EMBODIMENT

Figure 1:
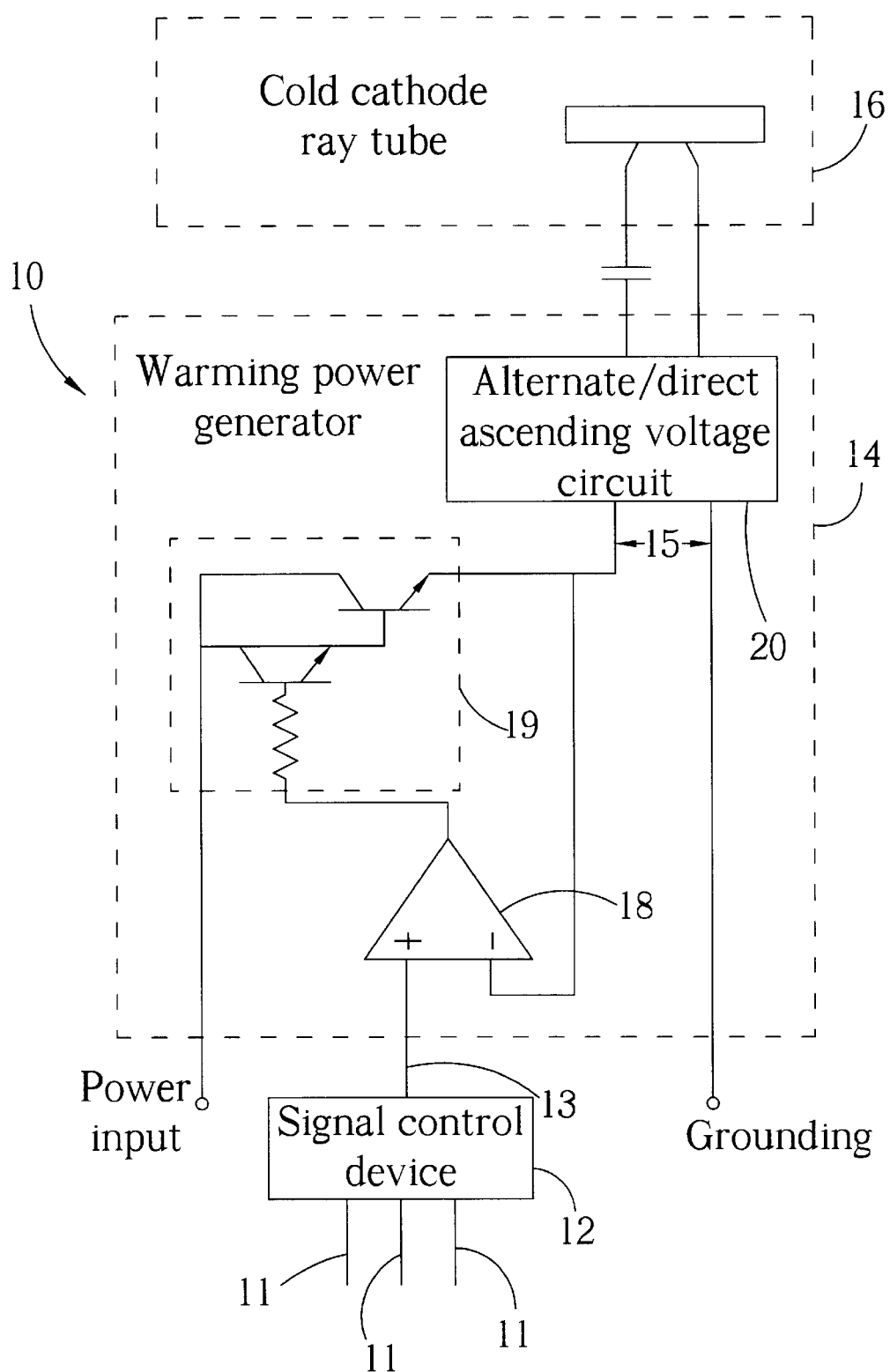
FIG. 1 is a functional block diagram of a prior art optical scanner.
Figure 3:
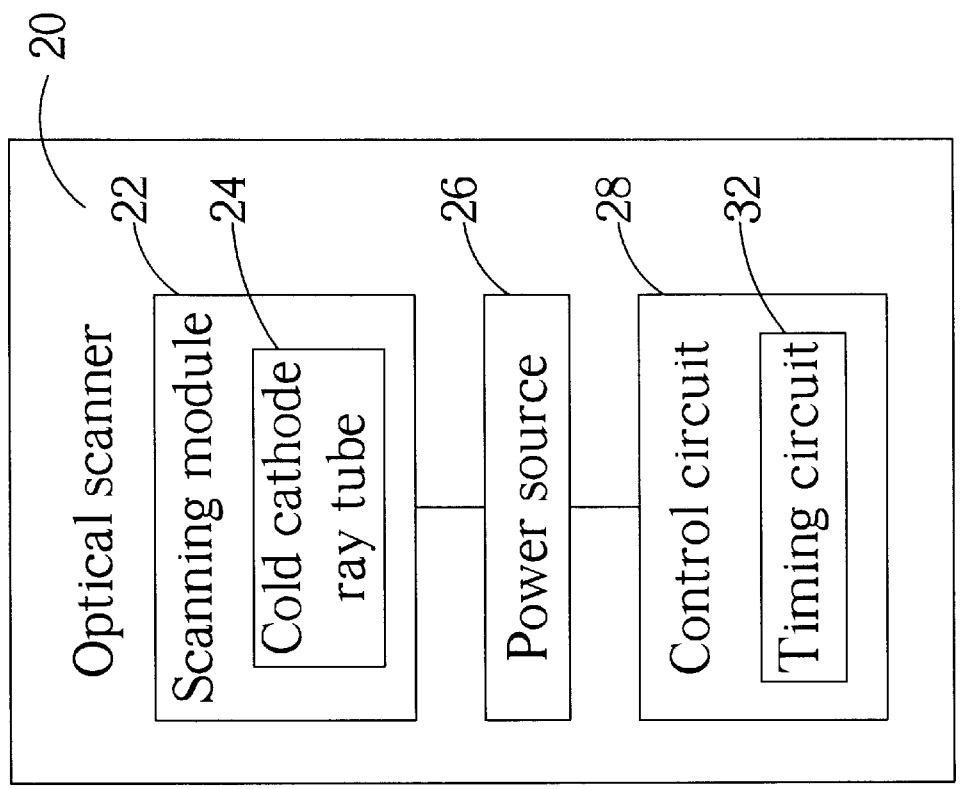
FIG. 3 is a functional block diagram of an optical scanner according to the present invention.

Please refer to FIG. 3. FIG. 3 is a functional block diagram of an optical scanner 20 according to the present invention. The optical scanner 20 comprises a scanning module 22 for scanning a document to generate corresponding image signals, a cold cathode ray tube 24 installed in the scanning module 22 for supplying light to the document when scanning the document, a power source 26 for supplying electric power to the cold cathode ray tube 24, and a control circuit 28 for controlling all operations of the scanner 20.

The control circuit 28 comprises a timing circuit 32. When the scanner 20 is in use, the control circuit 28 controls the power source 26 such that electric power is supplied to the cold cathode ray tube 24. The cold cathode ray tube 24 is thus maintained at a predetermined voltage to scan the document. After the scanner 20 is no longer in use, it enters an idle state. At this time, the timing circuit 32 keeps track of the idle time while the control circuit 28 controls the active period of each duty cycle of the power source 26 according to a predetermined power saving mode. This serves to reduce the electric power supplied to the cold cathode ray tube 24 thus maintaining the cold cathode ray tube 24 in a warmed state. If maintained in a warmed state, the startup time of the cold cathode ray tube 24 to scan the document is reduced.

Figure 4:
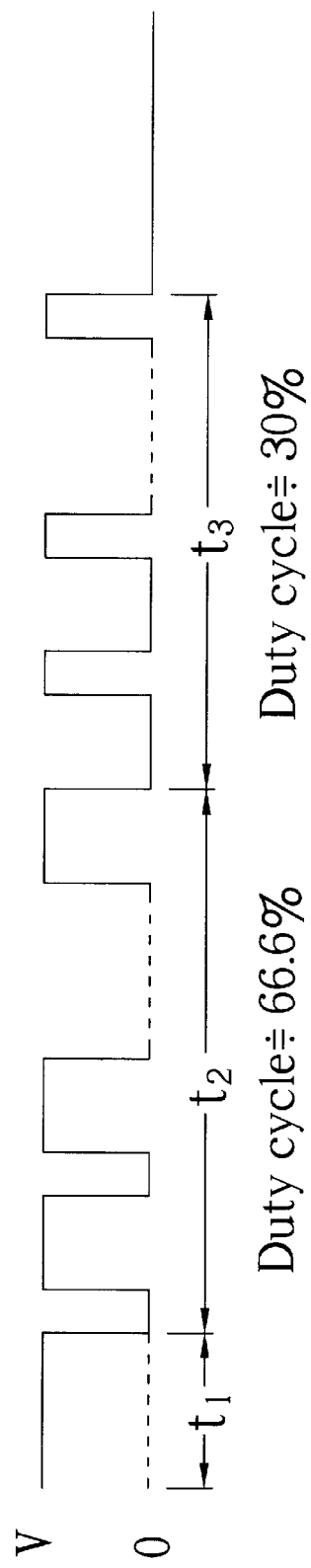
FIG. 4 is a timing diagram of the power source supplying electric power to the cold cathode ray tube.

Please refer to FIG. 4. FIG. 4 is a timing diagram of the power source 26 supplying electric power to the cold cathode ray tube 24. When the scanner 20 is not in use for a period of time t1, the control circuit 28 decreases the active period of each duty cycle of the power source 26 thus maintaining the cold cathode ray tube 24 in a standby state. The duty cycle is about 66.6%. If the scanner 20 is still idle after a period of time t2, the power source 26 will reduce the electric power supplied to the cold cathode ray tube 24 so that the cold cathode ray tube 24 can be maintained in a suspended state. At this time, the duty cycle is about 30%. If the scanner 20 is still idle after a period of time t3, the power source 26 will stop supplying electric power to the cold cathode ray tube 24. When use of the scanner 20 resumes, the power source 26 begins to supply electric power to the cold cathode ray tube 24 for scanning. The warm-up time required by the cold cathode ray tube 24 depends on the status of the cold cathode ray tube 24 prior to warm-up. The longer the time the cold cathode ray tube 24 is idle, the longer the warm-up time required.

Compared with the prior art optical scanner 10, the power source 26 of the scanner 20 reduces the duty cycle of the electric power supplied to the cold cathode ray tube 24. When the power source 26 supplies power, the supplied voltage is maintained at V volts. When the power source 26 does not supply power, the supplied voltage is drops to 0V. Therefore, the scanner 20 provides an effective method for saving power by controlling the length of time power is supplied. The warming time is shorter if the scanner 20 starts scanning after being idle. Also, the optical scanner 20 is simple and inexpensive to produce.

Those skilled in the art will readily observe that numerous modifications and alterations of the propeller may be made while retaining the teachings of the invention. Accordingly, the above disclosure should be construed as limited only by the metes and bounds of the appended claims.

What is claimed is:

1. An optical scanner comprising:
    a scanning module for scanning a document to generate corresponding image signals;
    a cold cathode ray tube for supplying lights to the document when scanning the document;
    a power source for supplying electric power to the cold cathode ray tube;
    a control circuit for controlling operations of the scanner; and
    a timing circuit for providing a timer to the control circuit;
        wherein when the scanning module is in an idle state, the control circuit controls an active period of a variable duty cycle of the power source by reducing the active period of the duty cycle as time spent in the idle state increases thereby reducing the electric power supplied to the cold cathode ray tube so that the cold cathode ray tube can be maintained in a warm state and the startup time for warming the cold cathode ray tube to scan the document is reduced.

2. The optical scanner of claim 1 wherein the control circuit controls the supplying of the electric power from the power source to the cold cathode ray tube according to a predetermined power saving mode.

3. The optical scanner of claim 2 wherein when the scanning module is in the idle state, the timing circuit initiates the timer to start tracking the idle time and reduce the electric power supplied to the cold cathode ray tube according to the idle time and the predetermined power saving mode.

4. A power controlling method used in an optical scanner which comprises a scanning module for scanning a document to generate corresponding image signals, a cold cathode ray tube for supplying light to the document when scanning the document, and a power source for supplying electric power to the cold cathode ray tube, the power controlling method comprising:
    when the scanning module is in an idle state, controlling an active period of a variable duty cycle of the power source by reducing the active period the duty cycle as time spent in the idle state increases thereby reducing the electric power supplied to the cold cathode ray tube so that the cold cathode ray tube can be maintained in a warm state and the startup time for warming the cold cathode ray tube to scan the document is reduced.

5. The method of claim 4 wherein the scanner comprises a control circuit for controlling the electric power supplied from the power source to the cold cathode ray tube.

6. The method of claim 5 wherein the control circuit controls the power source according to a predetermined power saving mode.

7. The method of claim 6 wherein the control circuit comprises a timer and a timing circuit electrically connected to the timer wherein when the scanner get into the idle state, the timing circuit initiates the timer to start tracking the idle time and reduce the electric power supplied to the cold cathode ray tube according to the idle time and the predetermined power saving mode.

\* \* \* \* \*

UNITED STATES PATENT AND TRADEMARK OFFICE
CERTIFICATE OF CORRECTION

PATENT NO. : 6,549,305 B1
DATED : April 14, 2003
INVENTOR(S) : Chen, Michael

It is certified that error appears in the above-identified patent and that said Letters Patent is hereby corrected as shown below:

<u>Title page,</u>
Item [73], Assignee, delete "Avison Inc." insert -- Avision Inc.

Signed and Sealed this

First Day of June, 2004

JON W. DUDAS
*Acting Director of the United States Patent and Trademark Office*